United States Patent [19]

Angelopoulos et al.

[11] Patent Number: 5,645,764
[45] Date of Patent: Jul. 8, 1997

[54] ELECTRICALLY CONDUCTIVE PRESSURE SENSITIVE ADHESIVES

[75] Inventors: Marie Angelopoulos, Cortlandt Manor, N.Y.; Jeffrey Donald Gelorme, Plainville, Conn.; Joseph Paul Kuczynski, Rochester, Minn.

[73] Assignee: International Business Machines Corporation, Armonk, N.Y.

[21] Appl. No.: 375,036

[22] Filed: Jan. 19, 1995

[51] Int. Cl.$^6$ .................. H01B 1/00; H01B 1/20; H01B 1/24
[52] U.S. Cl. .................. 252/500; 528/210; 528/422
[58] Field of Search .................. 252/500; 528/210, 528/422

[56] References Cited

U.S. PATENT DOCUMENTS

| | | | |
|---|---|---|---|
| 4,830,776 | 5/1989 | Thompson | 252/500 |
| 5,061,294 | 10/1991 | Harmer et al. | 252/500 |
| 5,264,552 | 11/1993 | Abe et al. | 528/422 |
| 5,378,403 | 1/1995 | Shacklette | 252/500 |

*Primary Examiner*—Douglas J. McGinty
*Assistant Examiner*—M. Kopec
*Attorney, Agent, or Firm*—Thomas A. Beck

[57] ABSTRACT

An electrically conductive pressure sensitive adhesive containing electrically conductive polymers used as an alternative to metallic solder in interconnect electronic applications.

29 Claims, 3 Drawing Sheets

ELECTRICALLY CONDUCTIVE PRESSURE SENSITIVE ADHESIVES

FIELD OF THE INVENTION

The present invention relates to an alternative electrical interconnect technology to the commonly-used soldering operations. More specifically the invention relates to an electrically conductive pressure sensitive adhesive comprising electrically conductive polymers in admixture with an appropriate pressure sensitive adhesive formulation. More particularly, this invention relates to electrically conductive substituted and unsubstituted polyanilines, substituted and unsubstituted polyparaphenylenes, substituted and unsubstituted polyparaphenylenevinylenes, substituted and unsubstituted polythiophenes, substituted and unsubstituted polyazines, substituted and unsubstituted polyfuranes, substituted and unsubstituted polypyrroles, substituted and unsubstituted polyselenophenes, substituted and unsubstituted polyphenylene sulfides and substituted and unsubstituted polyacetylenes formed from soluble precursors and to blending these materials with commonly available resinous or rubbery pressure sensitive adhesives. Blends of these aforementioned polymers are suitable for blending with the pressure sensitive adhesives. Copolymers made from the monomers used to form these polymers may also be blended with pressure sensitive adhesives.

BACKGROUND OF THE INVENTION

Numerous interconnection applications exist which currently utilize cumbersome soldering operations. In order to render the high volume manufacturing processes more efficient, as well as reducing part count and cost, an alternative packaging technique is desirable. Toward this goal, inherently conducting polymers such as polyanilines, polythiophenes, polyparaphenylenevinylenes, polypyrroles, etc., have emerged as a new and reliable class of materials for use in a broad range of electronic packaging applications.

Conducting polymers can be conveniently employed in applications where the use of metal would be too expensive or inappropriate due to processing considerations. Such applications generally require that the physical properties of the interconnect material impart resiliency, high initial and ultimate adhesion as well as corrosion resistance and especially flexibility. The combination of such properties is difficult to achieve with an all metal connection.

Presently one class of interconnect technology, pressure sensitive adhesives are made by dispersing conductive fillers, such as metal-coated graphite fibers or flakes, metal spheres and/or flakes, particles, fibers, or carbon in an electrically insulating polymeric binder or carrier. There are a number of problems associated with this technology. These include high filler costs, sloughing of the filler, physical property degradation through environmental stress cycling and low surface conductivity. In addition, the loading of the filler in these systems often exceeds 50% by volume. At such high loading levels, the physical properties of the adhesive degrades. To circumvent these problems, the use of electrically conducting polymers in pressure sensitive adhesive formulations has been developed in accordance with the present invention to result in pressure sensitive adhesives which: (1) have good physical and mechanical properties including good tack, adhesion, cohesive strength and flexibility; (2) have high surface conductivity at reasonable loading levels; (3) do not slough; (4) are corrosion resistant.

Electrically conducting organic polymers have been of scientific and technological interest since the late 1970's. These relatively new materials exhibit the electronic and magnetic properties characteristic of metals while retaining the physical and mechanical properties associated with conventional organic polymers. Technological application of these polymers are beginning to emerge. These polymers are electrically conductive substituted and unsubstituted polyanilines, substituted and unsubstituted polyparaphenylenes, substituted and unsubstituted polyparaphenylenevinylenes, substituted and unsubstituted polythiophenes, substituted and unsubstituted polyazines, substituted and unsubstituted polyfuranes, substituted and unsubstituted polypyrroles, substituted and unsubstituted polyselenophenes, substituted and unsubstituted polyphenylene sulfides and substituted and unsubstituted polyacetylenes formed from soluble precursors. Blends of these aforementioned polymers are suitable for use as are copolymers made from the monomers used to form these polymers.

The articles entitled *Polyaniline; Processability From Aqueous Solutions and Effective Water Vapor on Conductivity* to M. Angelopoulos et al., Synthetic Metals, 21 (1987) pp.21–30, and the article entitled *Polyaniline: Solutions, Films, and Oxidation State* to M. Angelopoulos et al., Mol. Cryst. Liq. Cryst. 160–151 (1988), describe a chemically synthesized emeraldine base form of polyaniline which is soluble in various solvents. The emeraldine base is doped by reacting, the emeraldine powder or film with aqueous acid solution for several hours, for example, aqueous acetic acid or aqueous HCl.

U.S. Pat. No. 3,907,557 discloses electrostatic imaging labels consisting of an electrostatic face material which is an photoconductor, a non-conducting adhesive layer, and a release liner coated with an ionic conducting agent.

U.S. Pat. No. 4,842,768 discloses a conducting adhesive consisting of a polymerizable ionic unsaturated monomer, a silyl methacrylate monomer and a methacrylate monomer in water.

U.S. Pat. No. 4,855,077 discloses an ionic conducting sticking agent attained by adding an ionic conductor to the reaction product of a polyurethane/alcohol prepolymer and a polyurethane/isocyanate prepolymer.

U.S. Pat. No. 4,830,776 discloses a conducting pressure sensitive adhesive consisting of an adhesive isobutylene polymer and a conducting quaternary ammonium polymer.

U.S. Pat. Nos. 4,539,996 and 4,524,087 disclose a biomedical electrode and a process for forming same by coating an adhesive onto a conducting electrode. The references disclose adhesives cited in the prior art which were made conductive by addition of ionic monomers.

U.S. Pat. No. 4,554,924 discloses an improvement to U.S. Pat. Nos. 4,539,996 and 4,524,087 wherein ionic salts are added to the adhesive formulation to form non-polarizing biomedical electrodes.

U.S. Pat. No. 4,273,135 discloses a disposable biomedical electrode containing a hydrophilic polymer between the electrode surface and the skin.

U.S. Pat. No. 4,848,353 discloses a composition of a conducting pressure sensitive adhesive consisting of a polymeric matrix obtained by the copolymerization of a hydrogen donating monomer such as acrylic acid and a hydrogen accepting monomer such as N-vinylpyrrolidinone. The matrix is mixed with a conducting plasticizing solution comprising a water solution of a salt and a glycerol compound.

In each of the references cited above there is no composition cited which discloses or implies the composition of the present invention.

SUMMARY OF THE INVENTION

A broad aspect of this invention relates to a polymeric material which is electrically conductive in admixture with a resinous or rubbery pressure sensitive adhesive. The electrically conducting polymeric component noted above possesses such conducting property because it is doped, for example by protonation. The preferred polymer as noted above is polyaniline. Polyanilines are rendered conductive by treatment with cationic reagents (Lewis acids), most commonly protonic acids. Also the polyaniline can be doped by taking the non-conductive form of the polymer and amine triflate salts (which thermally generate acid) and mildly heating them together in the form of a film or in solution. Also tosylates and borates can be used. Examples of this method and the polymers and salts used therein are disclosed in U.S. Pat. No. 5,198,153, the contents of which are hereby incorporated by reference herein.

There is prior art that discloses blending polyaniline with a dopant. U.S. Pat. No. 4,851,487 discloses the doping reaction of polyaniline with anhydrides and the uses of polyimide oligomers having anhydride terminated functionality (R—CO—O—C—CO—) as dopants. U.S. Pat. No. 4,855,361 discloses an anhydride doped polyaniline blended with polyimides to form a non compatible polymeric composite. The contents of both of these references are hereby incorporated by reference herein.

These and other objects, features and advantages will be apparent from the following more particular description of the preferred embodiments and the Figures appended thereto.

DETAILED DESCRIPTION OF THE PREFERRED EMBODIMENTS

Figure 1:
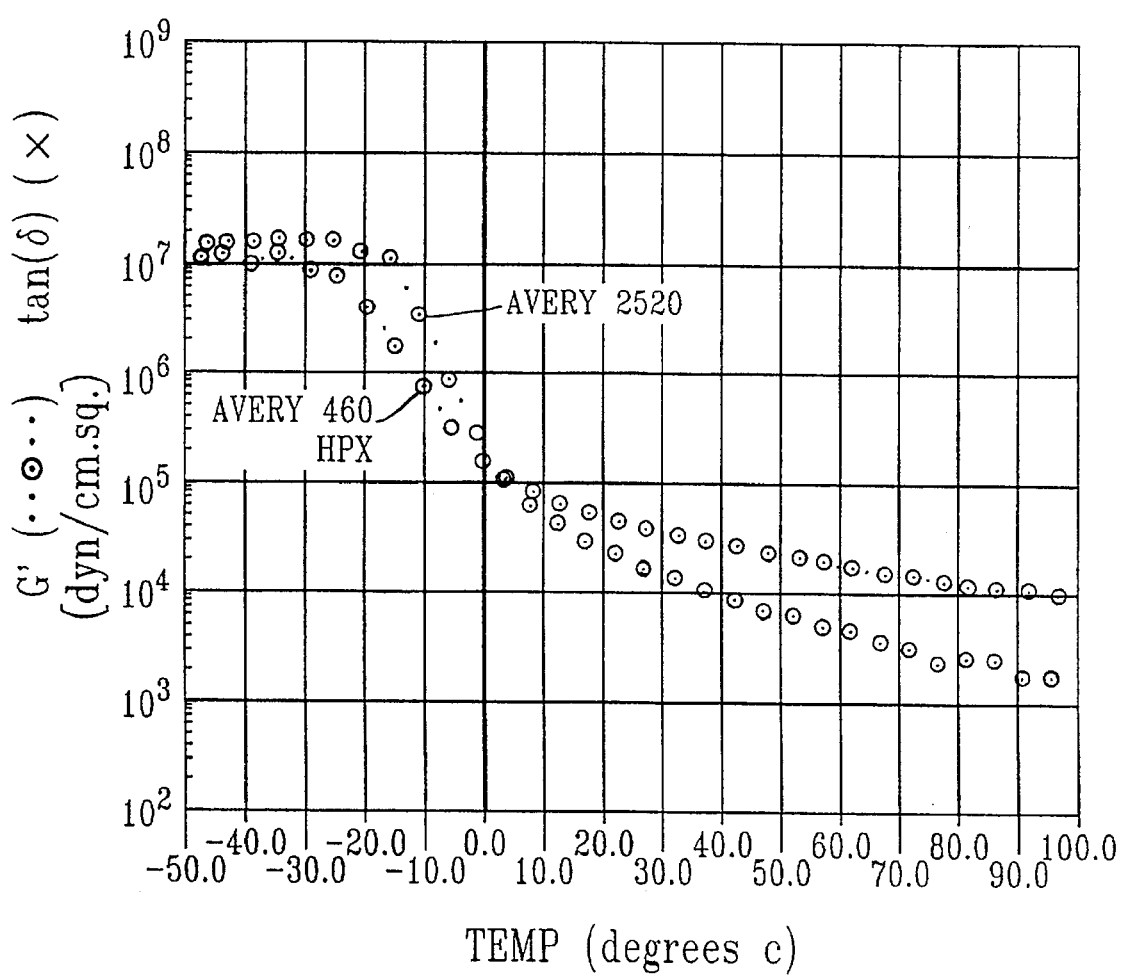
FIG. 1 is a is a plot of shear modulus vs. temperature for two acrylic pressure sensitive adhesives containing no polyaniline.

One embodiment of the composition of matter of the present invention is an electrically conductive polymeric material in admixture with a pressure sensitive adhesive.

The resinous or rubbery pressure sensitive adhesive can be chosen from any of the various pressure sensitive adhesives presently available in the industry including: polyisoprene formulations, styrene-diolefin triblock copolymers, styrene/butadiene copolymers, polyisobutylene, ethylene-vinyl acetate copolymers, vinyl acetate coplymers, polyacrylic acid and polymethacrylic acid, and esters thereof and copolymers made from the acrylic and methacrylic monomers, poly(vinyl alkyl ethers) silicones, urethanes, etc.

As noted above, the electrically conductive polymers used in the present invention are substituted and unsubstituted polyanilines, substituted and unsubstituted polyparaphenylenes, substituted and unsubstituted polyparaphenylenevinylenes, substituted and unsubstituted polythiophenes, substituted and unsubstituted polyazines, substituted and unsubstituted polyfuranes, substituted and unsubstituted polypyrroles, substituted and unsubstituted polyselenophenes, substituted and unsubstituted polyphenylene sulfides and substituted and unsubstituted polyacetylenes formed from soluble precursors. Blends of these aforementioned polymers are suitable for use as are copolymers made from the monomers used to form these polymers.

The electrically conducting polymers are described in detail U.S. Pat. No. 5,198,153 noted above and U.S. application Ser. No. 08/118,475. The contents of these references are hereby incorporated by reference herein.

The admixture of the present invention consists of between about 0.3% and 40% by weight, preferably 5% to 15% by weight, electrically conductive polymer admixed in the pressure sensitive adhesive. Most preferably the range is 1% to 10% by weight.

The components described herein can be blended to form the admixture of the present invention using aqueous or organic solvents. Suitable organic solvents are gamma butyrolactone, N-methyl pyrrolidinone, toluene, xylene, toluene/ethyl acetate, chloroform, m-cresol, toluene/isopropyl alcohol/hexane, etc.

Polyanilines are the preferred conducting polymers used in accordance with the present invention. Polyanilines are used to illustrate the invention although the other polymers disclosed herein are equally efficient. "Polyaniline" encompasses a family of polymers of which numerous derivatives can be selected based on modification of dopant, doping level, ring and nitrogen substituents. Copolymers and blends of this family of polymers can also be utilized in this invention. The chemical flexibility of the polyanilines allows such properties as conductivity and solubility to be tailored, which further allows the properties of the resulting conducting pressure sensitive adhesive to be controlled. In general, polyanilines have conductivity ranging between 10 and 400 S/cm depending upon the nature of the dopant and on processing techniques.

The preferred embodiment of the invention can be illustrated by means of the following examples.

For the purpose of the examples set forth below, polyaniline was synthesized by the oxidative polymerization of aniline monomers. The material in its non-conducting form was made conducting by addition of various acids or electrophiles to result in the conducting form. Soluble polyaniline salts included: ortho-ethoxy substituted polyaniline and unsubstituted polyaniline doped with toluene sulfonic acid, dodecylbenzenesulfonic acid and camphor sulfonic acid. The dispersible polyaniline is sold under the commercial name Versicon. The following specific blends were prepared:

EXAMPLE 1

Various mixtures of up to 40% by weight polyaniline in powder form plus Avery acrylic pressure sensitive adhesive AS-2520 which is blend of acrylic copolymers including poly(vinyl acetate), polyacrylic acid, and other polyacrylic and polymethacrylic esters in a toluene/ethyl acetate solution were physically blended. The polyaniline powder was compatible with the pressure sensitive adhesive.

EXAMPLE 2

Various mixtures of up to 40% by weight polyaniline in powder form plus Avery acrylic pressure sensitive adhesive AS-460HPX which is blend of acrylic copolymers including polyacrylic acid, and other polyacrylic and polymethacrylic esters in a toluene/isopropyl alcohol/hexane solution were physically blended. The polyaniline powder was compatible with the pressure sensitive adhesive.

EXAMPLE 3

Various mixtures of up to 40% by weight polyaniline in powder form plus Kraton styrene-diolefin triblock copolymer pressure sensitive adhesive were physically blended. The polyaniline powder was compatible with the rubbery pressure sensitive adhesive.

EXAMPLE 4

Up to 40% by weight ethoxy substituted polyaniline doped with toluene sulfonic acid was combined in gamma butyrolactone solution with the type pressure sensitive adhesives disclosed in Examples 1–3. The procedure was duplicated at loading levels of 7% and 10%. Equally effective results were obtained.

EXAMPLE 5

Up to 40% by weight of an unsubstituted polyaniline doped with toluene sulfonic acid was combined in N-methyl pyrrolidinone solution with the type pressure sensitive adhesives disclosed in Examples 1–3. The procedure was duplicated at loading levels of 7% and 10%. Equally effective results were obtained.

EXAMPLE 6

Polyaniline was doped with dodecylbenzenesulfonic acid. This conductive polymer was soluble in toluene. Several compositions containing 5% and 10% solutions were blended with the pressure sensitive adhesives set forth in Examples 1–3 above.

EXAMPLE 7

Polyaniline doped with camphor sulfonic acid was determined to be soluble in chloroform and m-cresol. Using these solvents, blends at various levels were prepared using the polyaniline with the pressure sensitive adhesives set forth in Examples 1–3 above.

EXAMPLE 8

Up to 40% by weight of a water soluble polyaniline is blended with a water soluble acrylic polymer pressure sensitive adhesive formulation.

Conductivity measurements were performed on the blends set forth above. Using the dispersion method described for Examples 1–8 it was determined that a loading level of approximately 30% by weight is generally optimally needed to reach the bulk conductivity of polyaniline.

Using the solution blending loading levels of generally less than 10% by weight are optimally needed to reach the bulk conductivity of the polyaniline. The conductivity of the polyaniline depending on derivative ranges from about 1 to 400 S/cm.

Rheology studies were conducted on the pressure sensitive adhesive before and after blending with the polyaniline in accordance with the Examples 1–8.

Figure 2:
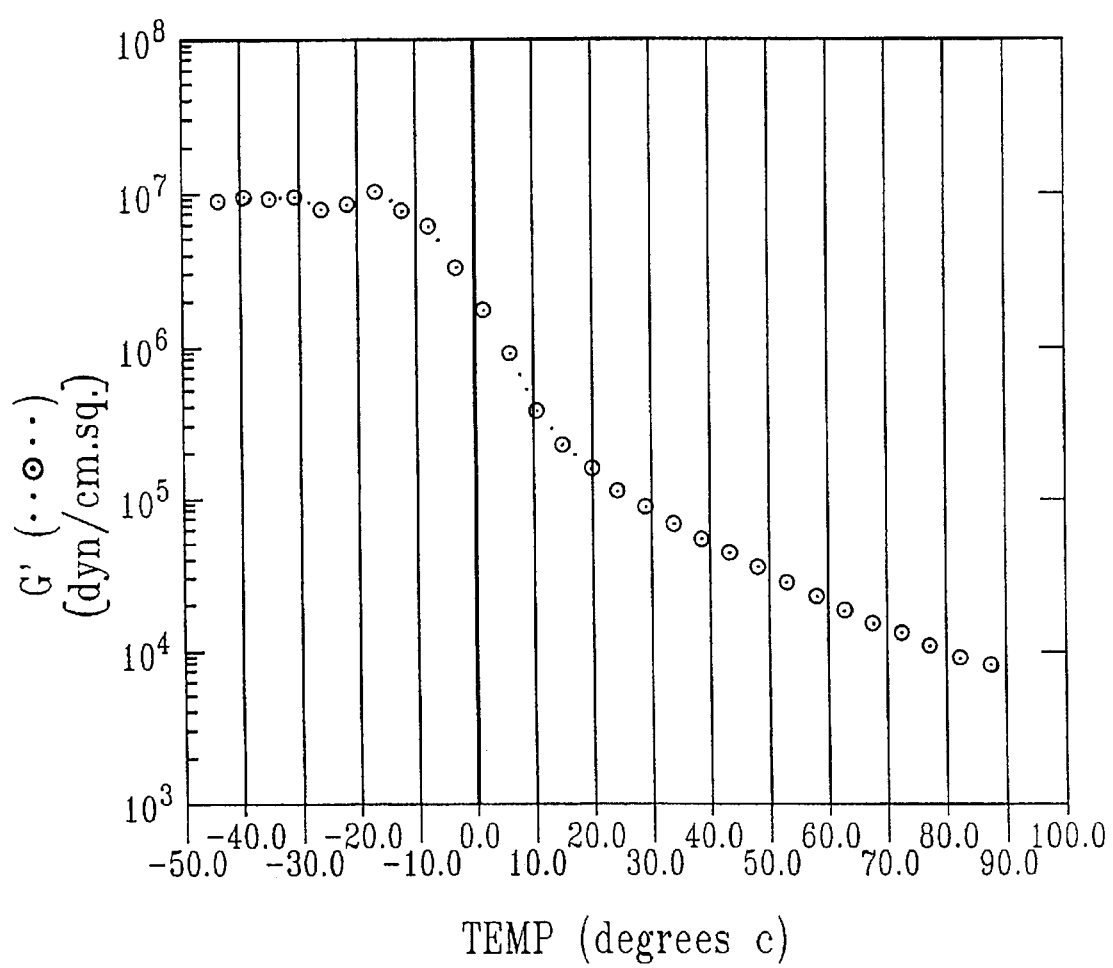
FIG. 2 is a plot of shear modulus vs. temperature for one of the conducting pressure sensitive adhesive of FIG. 1 containing 30% by weight dispersed polyaniline.
Figure 3:
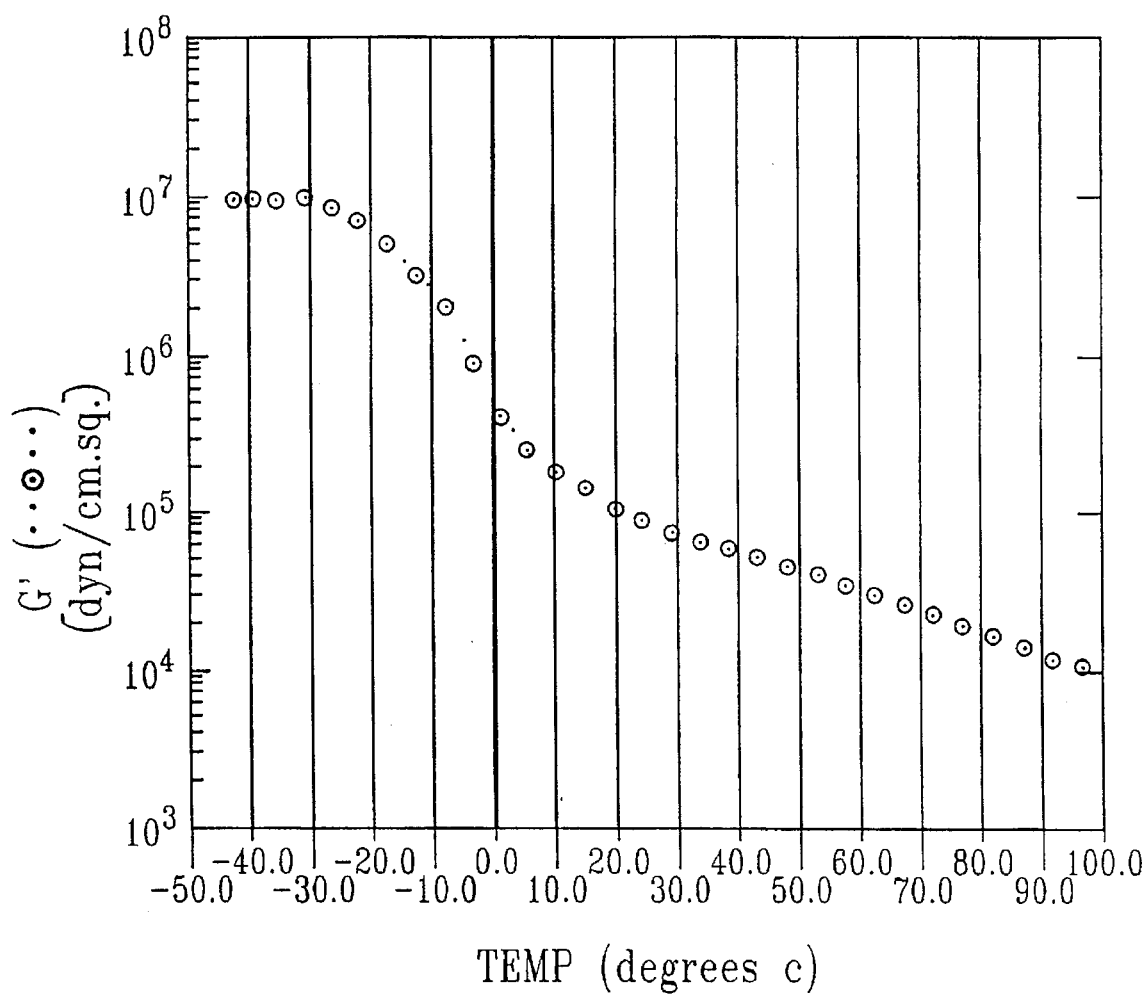
FIG. 3 is a plot of shear modulus vs. temperature for the other conducting pressure sensitive adhesive of FIG. 1 containing 30% by weight dispersed polyaniline.

FIG. 1 of the drawings is a graph plotting the shear modulus of the Avery 2520 and the Avery 460HPX (each alone) having the compositions set forth above, as a function of temperature. FIGS. 2 and 3 compare these properties with polyaniline loaded with Avery 2520 and Avery 460 HPX respectively.

These conducting pressure sensitive adhesives contain 30% loading of the dispersed polyaniline. As can be seen from a review of these graphs, the plots are substantially identical. The modulus and glass transition temperature of the adhesives have not been changed as a result of the incorporation of the polyaniline therein. The viscoelastic properties of pressure sensitive adhesives generally determine the adhesives physical properties such as tack, the adhesion, and the cohesive strength. The data disclosed in FIGS. 1–3 indicate that even at loading levels at the upper range (i.e. about 30% by weight), the physical properties of the pressure sensitive adhesives have not been degraded.

It was determined that the materials used in accordance with the present invention do not phase separate and as indicated above, the physical properties of the pressure sensitive adhesive are not disrupted. The blends also possess a low glass transition temperature which is generally desirable for pressure sensitive adhesive to have good tack properties.

The final products can be used in computer products such as disc drives and gaskets or any application where metallic solder was formerly used.

Having thus described our invention, we claim as new and desire to secure by Letters Patent is:

1. A composition of matter of an electrically conducting admixture of an organic solvent soluble or water soluble pressure sensitive adhesive formulation selected from the group consisting of polyisoprenes, styrene-diolefin triblock copolymers, styrene-butadiene copolymers, polyisobutylenes, ethylene-vinylacetate copolymers, acrylics, poly(vinyl alkyl ethers) precursors and subsequently cured silicones and urethanes and between about 0.3% and 40% by weight of an electrically conducting polymer wherein said electrically conductive polymer is substituted and unsubstituted polyanilines, substituted and unsubstituted polyparaphenylenes, substituted and unsubstituted polyparaphenylenevinylenes, substituted and unsubstituted polythiophenes, substituted and unsubstituted polyazines, substituted and unsubstituted polyfuranes, substituted and unsubstituted polypyrroles, substituted and unsubstituted polyselenophenes, substituted and unsubstituted polyphenylene sulfides and substituted and unsubstituted polyacetylenes formed from soluble precursors, blends of said substituted and unsubstituted polymers, and copolymers made from the monomers used to form said polymers and wherein the constituents comprising said admixture do not phase separate, and said glass transition temperature of said blend is below 30° C.

2. A composition of matter of an electrically conducting admixture of an organic solvent soluble or water soluble pressure sensitive adhesive formulation selected from the group consisting of polyisoprenes, styrene-diolefin triblock copolymers, styrene-butadiene copolymers, polyisobutylenes, ethylene-vinylacetate copolymers, acrylics, poly(vinyl alkyl ethers) precursors and subsequently cured silicones and urethanes and between about 0.3% and 40% by weight of an electrically conducting polymer wherein said electrically conductive polymer is substituted and unsubstituted polyanilines, substituted and unsubstituted polyparaphenylenes, substituted and unsubstituted polyparaphenylenevinylenes, substituted and unsubstituted polythiophenes, substituted and unsubstituted polyazines, substituted and unsubstituted polyfuranes, substituted and unsubstituted polypyrroles, substituted and unsubstituted polyselenophenes, substituted and unsubstituted polyphenylene sulfides and substituted and unsubstituted polyacetylenes formed from soluble precursors, blends of said substituted and unsubstituted polymers, and copolymers made from the monomers used to form said polymers and wherein said electrically conducting polymer is soluble in said pressure sensitive adhesive formulation.

3. The admixture of claim 1 wherein said pressure sensitive adhesive is blend of acrylic or methacrylic based homopolymers or copolymers, said blend including poly (vinyl acetate), polyacrylic acid, polymethacrylic acid, polyacrylic and polymethacrylic esters in a toluene/ethyl acetate solution in admixture with about 30% by weight of substituted or unsubstituted polyaniline.

4. The admixture of claim 1 wherein said pressure sensitive adhesive is a blend of acrylic or methacrylic based homopolymers or copolymers, said blend including polyacrylic acid, polymethacrylic acid, polyacrylic and polymethacrylic esters in a toluene/isopropyl alcohol/hexane solution in admixture with about 30% by weight of substituted or unsubstituted polyaniline.

5. The admixture of claim 3 wherein said electrically conducting polymer component is about 30% of a dispersed substituted or unsubstituted polyaniline in styrene-diolefin triblock copolymer.

6. The admixture of claim 3 wherein said electrically conducting polymer component is an ethoxy substituted polyaniline doped with toluene sulfonic acid.

7. The admixture of claim 3 wherein said electrically conducting polymer component is an unsubstituted polyaniline doped with toluene sulfonic acid.

8. The admixture of claim 4 wherein said electrically conducting polymer component is about 30% of a dispersed substituted or unsubstituted polyaniline in styrene-diolefin triblock copolymer.

9. The admixture of claim 4 wherein said electrically conducting polymer component is an ethoxy substituted polyaniline doped with toluene sulfonic acid.

10. The admixture of claim 4 wherein said electrically conducting polymer component is a dispersed unsubstituted polyaniline doped with toluene sulfonic acid.

11. The admixture of claim 3 wherein said electrically conducting polymer component is an unsubstituted polyaniline doped with dodecylbenzenesulfonic acid.

12. The admixture of claim 4 wherein said electrically conducting polymer component is an unsubstituted polyaniline doped with dodecylbenzenesulfonic acid.

13. The admixture of claim 3 wherein said electrically conducting polymer component is an unsubstituted polyaniline doped with camphor sulfonic acid.

14. The admixture of claim 4 wherein said electrically conducting polymer component is an unsubstituted polyaniline doped with camphor sulfonic acid.

15. A method of making the admixture of claim 1 wherein said pressure sensitive adhesive and said electrically conducting polymer are blended by dispersing one in the other.

16. A method of making the admixture of claim 1 wherein said pressure sensitive adhesive and said electrically conducting polymer are blended by solution blending.

17. The method of claim 16 wherein said solution blending is processed in organic medium.

18. The method of claim 16 wherein said solution blending is processed in aqueous medium.

19. The method of claim 17 wherein a solution of an ethoxy substituted polyaniline in gamma-butyrolactone solvent is solution blended with said pressure sensitive adhesive.

20. The method of claim 17 wherein a solution of an unsubstituted polyaniline in gamma-butyrolactone solvent is solution blended with said pressure sensitive adhesive.

21. The method of claim 17 wherein a solution of an ethoxy substituted polyaniline in N-methyl pyrrolidinone solvent is solution blended with said pressure sensitive adhesive.

22. The method of claim 17 wherein a solution of an unsubstituted polyaniline in N-methyl pyrrolidinone solvent is solution blended with said pressure sensitive adhesive.

23. The method of claim 17 wherein a solution of a polyaniline doped with dodecylbenzenesulfonic acid in toluene solvent is solution blended with said pressure sensitive adhesive.

24. The method of claim 17 wherein a solution of a polyaniline doped with camphor sulfonic acid in m-cresol solvent is solution blended with said pressure sensitive adhesive.

25. The method of claim 17 wherein a solution of a polyaniline doped with camphor sulfonic acid in chloroform solvent is solution blended with said pressure sensitive adhesive.

26. The admixture of claim 1 which is processed in solution applications.

27. The admixture of claim 26 which is processed in roll format.

28. The admixture of claim 26 which is processed in spray format.

29. The admixture of claim 1 which is applied to interconnect technologies.

* * * * *